May 23, 1944. B. PONTECORVO 2,349,753
METHOD AND APPARATUS FOR GEOPHYSICAL EXPLORATION
Filed Feb. 5, 1942 3 Sheets-Sheet 2
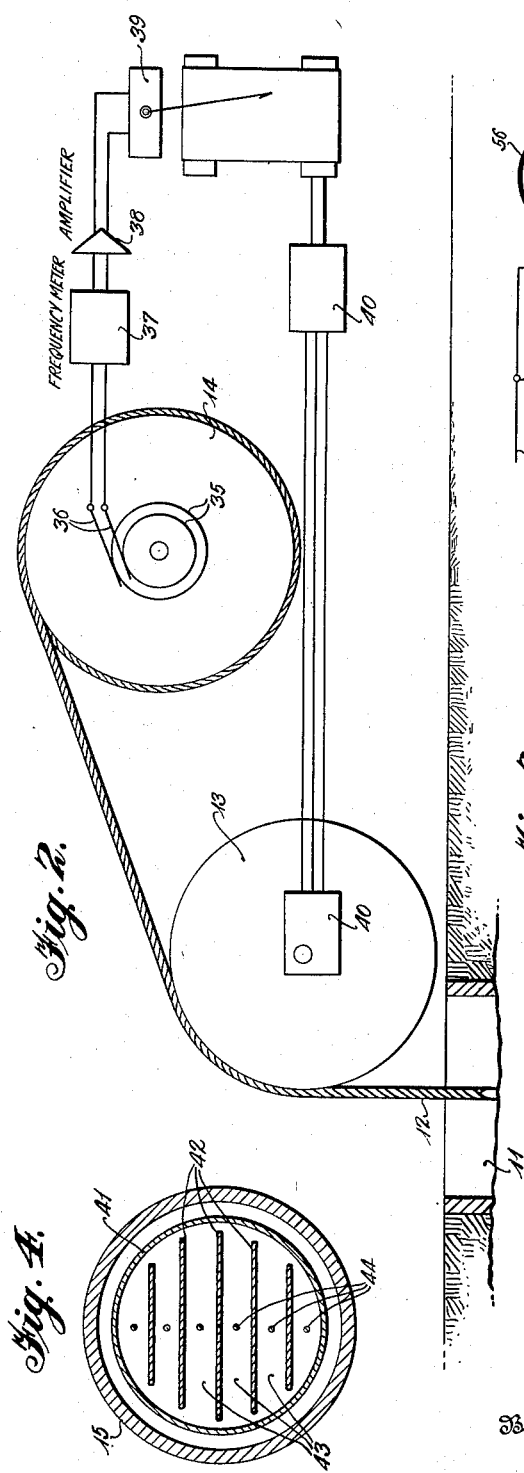
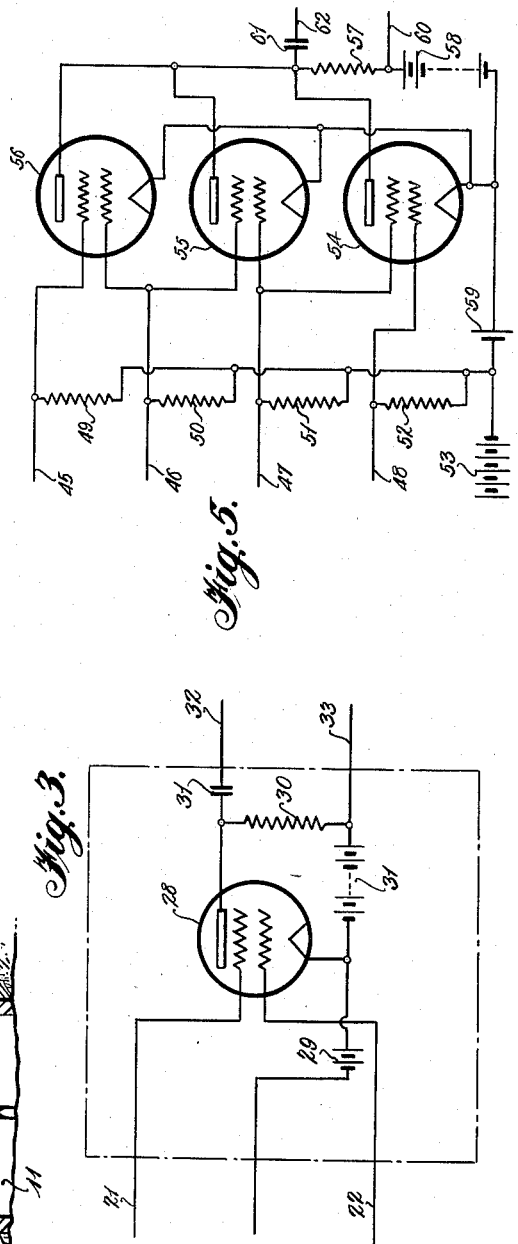
Inventor
*Bruno Pontecorvo*
By *Stevens and Davis*
Attorneys May 23, 1944. B. PONTECORVO 2,349,753
METHOD AND APPARATUS FOR GEOPHYSICAL EXPLORATION
Filed Feb. 5, 1942 3 Sheets-Sheet 3

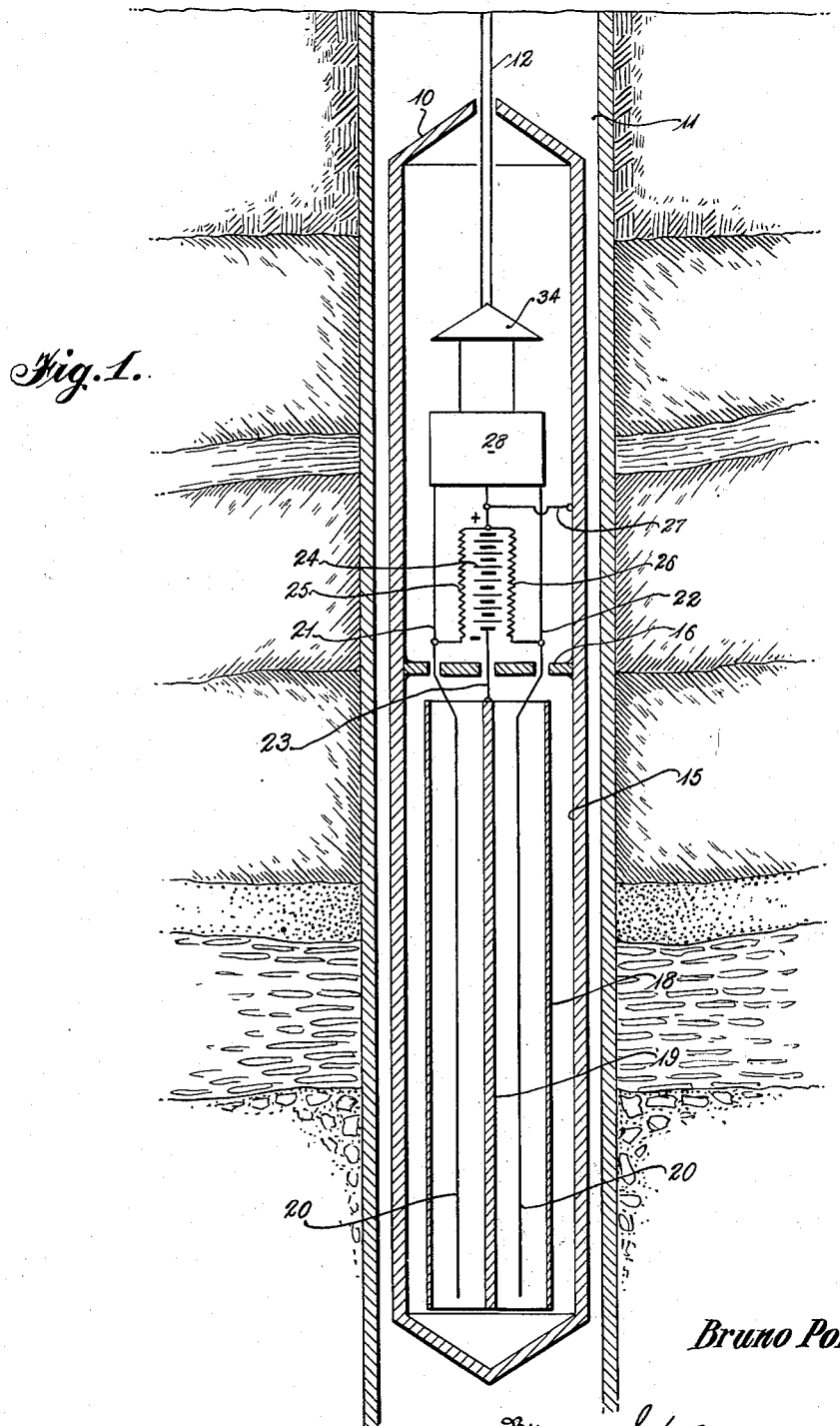

Inventor
Bruno Pontecorvo
By Stevens and Davis
Attorneys

Patented May 23, 1944

2,349,753

UNITED STATES PATENT OFFICE 2,349,753

METHOD AND APPARATUS FOR GEO-PHYSICAL EXPLORATION

Bruno Pontecorvo, Tulsa, Okla., assignor to Well Surveys, Incorporated, Tulsa, Okla., a corporation of Delaware Application February 5, 1942, Serial No. 429,684

18 Claims. (Cl. 250—83.6)

This invention is concerned with a method and apparatus for distinguishing between gamma rays emanating from various sources on the basis of their hardness, that is their frequency or the energy contained in each quantum, and upon the application of this method and apparatus to geophysical prospecting by the examination of the formations themselves from the surface of the earth, or even more especially by the examination of formations below the surface of the earth through the medium of a drill hole or other opening penetrating them.

Many measurements have been made of radiations of the type generated by radioactive substances. The measurement of these radiations has been found useful in geophysical prospecting and in many instances the measurement of the radiations emanating from a geological structure or sample taken from that structure has yielded valuable information as to the nature of the structure. Thus, to cite one specific example, an ionization chamber has been lowered into a drill hole in the earth and measurements made at various levels of the radiations emanating from the formations. These measurements when correlated with measurements of the depth at which they were taken have shown accurately the interfaces between the various strata and have even given good indications of the nature of particular strata.

It is not always sufficient, however, to have merely a measurement of the total radiation emanating from a particular stratum, formation or sample. In many instances the total amount of radiation will be the same for a plurality of strata, formations or samples and yet the strata, formations or samples will vary widely in their nature. It has been found desirable therefore to have more specific information about the radiation emanating from the particular geophysical specimen under observation.

It may be that two specimens will generate an equal effect or ionization and yet the radiation from the two specimens may be entirely different in its nature. For example, if the gamma radiation from one geophysical specimen were caused entirely by the presence of thorium then there would be a considerable portion of that radiation in which each quantum of gamma rays would have an energy of about 2.6 million electron volts. On the other hand, if the radiation were entirely caused by members of the radium-uranium family of elements a very considerable portion of the energy would be in the form of gamma radiation having around 2.2 million electron volts. It might be, however, that the total number of quanta of gamma rays from the two specimens would be exactly the same, or it might be that the total energy of gamma radiation from the two samples might be the same. Thus, in the first case, if the total number of quanta were measured or, in the second case, if the total energy of the gamma radiation were measured, the difference between the two specimens might never be detected.

It is the purpose of this invention therefore to distinguish between quanta of higher energy and quanta of lower energy so that a better indication of the nature and source of the gamma rays may be had.

Methods have heretofore been proposed for accomplishing this general purpose by, in effect, filtering out the lower energy gamma rays by shields through which they would not penetrate, and measuring the higher energy gamma rays. The present method is an improvement upon this method. These earlier methods require relatively heavy shields because the gamma rays are quite penetrating and even the higher energy gamma rays that do penetrate the shield are so reduced in number as to make measurement or counting difficult.

According to the present invention much of the difficulty is avoided by not attempting to filter out the lower energy gamma rays but instead, converting as many as possible of the gamma rays that reach the detector into beta rays and thereafter determining the energy of the beta rays, or rather discriminating between the beta rays of higher energy, which result from the higher energy gamma rays, and the beta rays of lower energy, which result from the gamma rays of lower energy.

It has been found that this may be expediently accomplished by the use of a divided Geiger counter comprising an outer electrode enclosing at least two separate inner electrodes in separate compartments therein and into either of the divisions of which gamma rays may enter and react to form beta rays. If the Geiger counter is separated into two parts by a partition through which only beta rays of higher energy may pass, then only one part will be actuated by a quantum of gamma radiation of lower energy whereas a quantum of gamma radiation of higher energy may form beta rays of higher energy which will pass through the dividing partition and actuate both counters simultaneously. By the use of a well known coincidence circuit, a record may be made of the simultaneous actuations of both counters and the separate actuation of one or the other of the counters may be discarded or, if desired, separately observed or recorded.

In any such arrangement as the one described there will be a certain number of coincidences in which both divisions of the apparatus will be simultaneously actuated without a gamma quantum of higher energy having generated a high energy beta ray in the proper direction. Such actuation may occur if gamma radiations strike both counters (accidental coincidences) simultaneously, i. e., within the resolving time of the system, or if a quantum so reacts as to give part of its energy to form beta radiation in one counter and part of its energy to form beta radiation in the other counter (Compton effect).

The accidental coincidences will usually be small in number as compared to the coincidences of interest and under certain conditions may be disregarded. Alternatively, the number of accidental coincidences can be computed if one knows the resolving time of the counter system. If desired, a correction may be made for the accidental and Compton coincidences by using a second divided counter in which the dividing wall is of sufficient thickness to preclude the passage of any beta radiations that are likely to be generated. The number of coincidences occurring in such a counter is then a measure of the number of accidental and Compton coincidences that are occurring in the counter used for the actual measurement provided the number of single impulses in the divisions are equal for the two arrangements. The measurement made by this second counter may be used to correct the measurement made by first so as to obtain a true result.

It has been found desirable to so divide the counter, or to so construct the two counters if one prefers to consider the divided counter as two separate counters, which in fact it is, as to cause as many as possible of the higher energy beta rays generated to impinge upon the separating partition and pass through it into the other counter. A construction that has been found desirable for this purpose is a cylindrical chamber divided by a partition extending axially through it and having a central electrode or wire in each division. This partition may well be made of aluminum of a thickness of around 0.37 centimeter, when the discrimination is to be made between gamma radiation from the radium-uranium family and gamma radiation from the thorium family. Beta radiation generated by gamma radiation from the radium-uranium group of elements will not be able to penetrate this partition, whereas beta radiation generated by gamma radiation from elements of the thorium family will, to a considerable extent, be able to penetrate the partition and will cause coincidences.

It is to be understood, however, that although the division of the counter into two parts has been mentioned, it can, if desired, be divided into more than two parts, and this in many instances will probably be desirable in order to increase the surface area of the outer electrode and hence increase the likelihood of the beta rays being formed.

For the particular use for which this invention is intended, the counter arrangement, an electrical coincidence circuit which will respond only to simultaneous actuation of the several counters and an amplifier, will ordinarily be enclosed in a protecting capsule and lowered into a well or other opening in the earth. This capsule will be supported by a cable which will carry electrical connections from the amplifier to a frequency recording device on the surface and this device will record the frequency of coincidences in correlation with indications of the depth at which the device is operating.

For further details of a specific device embodying the principles of this invention and for a more complete understanding of the mode of application of the principles of this invention and the numerous advantages thereof, reference may be had to the appended drawings and the following detailed description thereof.

In the drawings:

Figure 1 is a diagrammatic illustration of the part of a device for logging wells in accordance with the principles of this invention that is to be lowered into a well;

Figure 2 is a diagrammatic illustration of the surface equipment to be used with the device of Figure 1;

Figure 3 is a diagrammatic illustration of a coincidence counting circuit for use in the device of Figure 1;

Figure 4 is a diagrammatic illustration in cross-section of a modification of counter arrangement;

Figure 5 is a diagrammatic illustration of a circuit for use with a counter divided into four sections.

Figure 6:
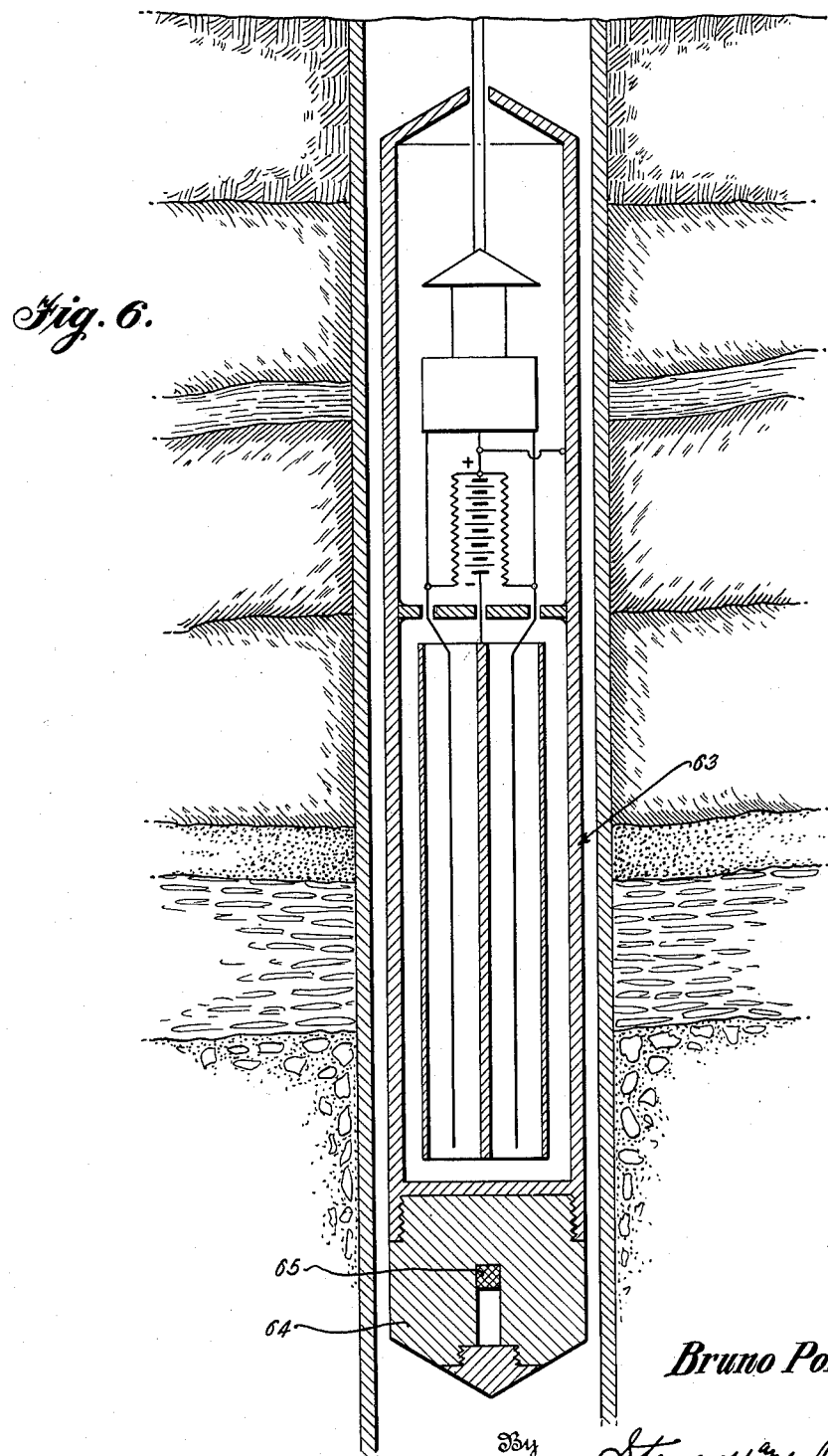
Figure 6 is a diagrammatic illustration of a modification in which a source of neutrons is lowered with the detecting apparatus.

As illustrated in Figures 1 and 2 this device comprises a steel capsule 10 suspended in a well or other opening in the earth 11 at the lower end of a cable 12 extending downward from the surface of the earth. At the surface of the earth the cable 12 passes over a measuring wheel 13 and is wound on a cable drum 14.

Within the lower portion of the capsule 10 is formed a counter apparatus 15 of generally cylindrical shape and divided into two parts.

The lower portion of the capsule 10 forms the side walls and bottom of this double counter and a partition 16 extending across the capsule 10 forms the upper wall of the ionization chamber and separates the ionization chamber from the upper portion of the capsule. This partition may be welded in place or secured in any other manner desired.

Inside of the capsule is positioned a cylindrical sheet metal electrode 18 generally of sheet iron and the cylindrical space inside this electrode is divided into two portions by an axially extending aluminum partition 19. In each of the two spaces thus formed is positioned a wire electrode 20 so that there are in effect two counters separated by an aluminum partition 19.

As can be seen from the drawings the two electrode pairs are both enclosed in the same chamber and the aluminum plate or partition 19 is joined directly to the outer electrode 18 which electrode, in operation, acts as two electrodes, one for each of the wire electrodes 20. It will be apparent however that the outer electrode 20 may be axially divided into two separate electrodes electrically insulated from each other and that the central dividing partition 19 may also be insulated from the electrode or electrodes 18. It will further be apparent that the apparatus may be completely separated into two separate counters by the aluminum partition 19. The counters will preferably be of the "fast" type.

self-quenching counters like alcohol filled ones, which need comparatively small resistance of the order of $10^5$ ohms in series with them.

Electrical connections 21 and 22 extend from the two electrodes 20 through the top 16 of the counter apparatus and a connection 23 extends from the outer electrode 18 through the top 16 in the same manner. Each of these connections is packed and insulated at the place it extends through the top of the counter so that the connection will not short circuit to the casing.

The connection 23 from the outer electrode leads to the negative pole of a battery 24 or other source of potential and the connections 21 and 22 lead through resistors 25 and 26 of around $10^5$ ohms resistance respectively to the positive pole of the same battery or power source. The positive pole of the battery 24 is grounded to the casing or capsule 10 through a connection 27. The said polarity of the two electrodes which is well adapted for some coincidence circuits, (for example for the Rossi circuit) has to be changed if the circuit of Figure 3 is selected.

Coincident reactions in the two halves of the counter are detected by a coincidence circuit 28. This circuit may be of the type described on page 478 of Modern Physics (Second Edition) written by G. E. M. Jauncey and published by D. Van Ostrand Company, Inc., June 1937, or may be any other equivalent type of circuit, for example the so-called Rossi circuit. (Reference: Rossi, Nature, 125, 636, 1930.)

The only requirement is that the circuit respond to simultaneous reactions of the two chambers and not to non-simultaneous ones; of course, when we say simultaneous pulses we intend pulses separated by a time very small, i. e., separated by a time smaller than the so-called resolving time of the apparatus; this obviously has to be made very small in order to decrease the number of accidental coincidences: at the present it is not difficult to make this time smaller than $10^{-5}$ second. It will immediately be apparent that a number of circuits may be arranged to perform that function.

To further illustrate the type of circuit that may desirably be used, a possible circuit is shown in Figure 3 for which the polarity has to be such that the impulse on the wire of the counter has to be positive. This coincidence circuit consists of a double grid thermionic tube 28 one grid of which is connected to each of the wire electrodes 20 through the connections 21 and 22 and the cathode of which is connected through a grid bias battery 29 to the negative pole of the counter battery 24. As current flows in the resistors 25 and 26 the grids, respectively, become less negative in comparison with the cathode. The grid bias is arranged to be such that current will flow in the tube 28 only when both grids have become less negative than they normally are.

The plate of the tube 28 is connected through a resistor 30 and a B battery 31 back to the cathode and the alternating current pulses in the plate circuit are taken from across this resistor through a condenser 31 and connections 32 and 33 and pass on to an alternating current amplifier 34 also housed within the capsule 10. From the alternating current amplifier 34 these currents are sent to the surface.

At the surface of the earth the currents from the amplifier 34 pass through connections in the cable drum 14 into slip rings 35, from these slip rings to brushes 36, and from there to a frequency meter 37 which converts the frequency of the received signal into amplitude. The signal, now in terms of amplitude, may be further amplified by an amplifier 38 and is eventually recorded by a recorder 39. The tape of this recorder is driven from the measuring wheel 13 by a mechanical or electrical transmission of any desired type. For purpose of illustration this transmission system is shown as an electrical transmission 40 of the "Selsyn" type.

As a result of this arrangement a continuous graphic record is made on the surface of the earth of the frequency with which coincidences occur in the counters and this is in turn a measure of the intensity of the higher frequency or higher energy gamma radiation.

A separate determination of both higher and all frequencies of gamma radiation may be made and compared with the record made by the present device or the present device may be modified to include amplifying and recording equipment for all of the gamma radiations that impinge upon the counters of the present device. A still further possibility is that of including in the present device, amplifying and recording equipment that will amplify and record only gamma radiations which do not cause coincidences. This may be accomplished by connecting the two halves of the apparatus into a circuit in opposition so that an individual pulse from one counter is recorded but simultaneous pulses from both counters cancel and are not recorded, or by any of the so-called anticoincidence circuits, well known to those skilled in the art. (Reference: G. Herzog, Review of Scientific Instruments, 11, page 84, 1940.)

As previously mentioned, the counter may be divided, not into two compartments, but into a larger number of compartments, each compartment constituting in itself a separate counter. Thus a greater number of beta rays may be caused to be generated by the impinging gamma rays and measurements made more speedily. To illustrate this possibility a cross-section of a counter constructed according to this principle has been illustrated in Figure 4. In this figure the outer casing 15 is shown as enclosing a cylindrical electrode 41 which is divided by longitudinally extending partitions 42 into a whole series of compartments 43. Each of these compartments contain one or more wire-like electrodes 44 and all of the electrodes in each compartment are connected together and then to a coincidence counting circuit in the same manner as are the individual electrodes in Figure 1.

Since it is desirable in using such a counter as the one shown in Figure 4, to detect the coincidences occurring in adjacent sections of the counter and not to detect those occurring in non-adjacent sections, it is desirable to have a series of coincidence circuits, one between each pair of adjacent sections. A combined circuit for this purpose is shown in Figure 5, although it is to be understood that many other types of circuit can be used in lieu thereof.

As shown in Figure 5 the conductors 45, 46, 47 and 48 each lead from the wire-like electrodes 43 of one compartment or section, through a resistor 49, 50, 51 or 52 respectively, to the negative terminal of a battery 53.

A thermionic tube 54 is arranged to measure the coincidences between the signals coming in over the conductors 47 and 48 and to that end has one of its two grids connected to each of the incoming conductors 47 and 48. A second thermionic tube 55 has its grids similarly connected to the incoming conductors 46 and 47 and a third thermionic tube 56 has its grids connected to incoming conductors 45 and 46. The plates of the thermionic tubes 54, 55 and 56 are all connected together and current passes from them through a resistor 57 and a B-battery 58 back to the cathodes of the three tubes which are all connected together. A C-battery 59 connected between the cathodes and the negative terminal of the battery 53 provides the proper grid bias on the grids of the three thermionic tubes.

An inspection of this circuit will show that when signals arrive simultaneously over any adjacent pair of conductors, 45 and 46, 46 and 47, or 47 and 48, one of the three thermionic tubes will pass a current which will flow through the resistor 57. No current will flow however unless an incoming signal does arrive simultaneously over an adjacent pair of conductors. Thus when a coincidence does occur a current flows in the resistor 57 and the voltage across this resistor may be taken through a conductor 60, and condenser 61 and conductor 62, for further amplification and transmission to the surface of the earth.

It is to be understood that the circuit shown in Figure 5 is but one possible arrangement for detecting coincidences between adjacent counter compartments and that any other desired circuit may be used in its place.

At times it may be found desirable not to rely merely upon the natural radioactivity of the earth but to increase this radioactivity by radiation of the surrounding strata from the drill hole. For example, as shown in Figure 6, an instrument 63 of the type shown in Figure 1 and described in connection therewith may carry at its lower end a block of lead or other shielding material 64, in which is enclosed a source of neutrons 65, such as a mixture of mesothorium and barium sulphate. Radon and beryllium may be used for this purpose as may also polonium and a lithium salt.

In using such a device, the gamma radiation emitted by the source of neutrons is effectively attenuated by the shield 64 but emitted neutrons pass on through the shield and through the casing and into the surrounding formation. There they give rise to the generation of highly penetrating gamma radiations which return and are measured by the ionization chambers which form a part of the device described in connection with Figure 1.

The hardness of the returning radiations, as well as of the natural radiations, apparently depends upon the nature of the surrounding formation, and therefore the measurement of their hardness obtained by the apparatus described in connection with Figure 1 gives valuable information as to the nature of the surrounding strata.

It may, of course, be desired to make measurements with the device of Figure 1 and also with the device of Figure 6, for the differences found in the naturally emitted radiations and the differences found in the induced radiations do not depend entirely upon the same characteristics of the surrounding strata and therefore the information obtained by the two determinations amounts to more than mere duplication.

I claim:

1. A method of geophysical prospecting that comprises discriminating between radiations of varying energy that comprises utilizing said radiations to form beta radiations, detecting said beta radiations, causing said detected beta radiations to impinge upon a partition, detecting the beta radiations that are able to pass through said partition and comparing the results of the detections.

2. A method of geophysical prospecting that comprises discriminating between penetrating radiations of varying energy that comprises utilizing said radiations to form less penetrating radiations, detecting said less penetrating radiations, causing said less penetrating radiations to attempt to pass through a retarding medium and detecting those that are able to do so.

3. A method of geophysical prospecting that comprises discriminating between gamma radiations of varying frequency that comprises utilizing said radiations to form beta radiations, detecting said beta radiations, causing said detected beta radiations to attempt to penetrate a retarding medium and detecting the beta radiations that are able to penetrate said retarding medium.

4. A method of geophysical prospecting that comprises discriminating between gamma radiations of varying frequency that comprises utilizing said radiations to form beta radiations, detecting said beta radiations, causing said detected beta radiations to attempt to penetrate a retarding medium and detecting the beta radiations that are able to penetrate said retarding medium and observing coincidences between the detected effect of one beta particle before and after penetrating said retarding medium.

5. A method of geophysical prospecting that comprises discriminating between gamma radiations of varying frequency that comprises utilizing said radiations to form beta radiations, detecting said beta radiations, causing said detected beta radiations to attempt to penetrate a retarding medium and detecting the beta radiations that are able to penetrate said retarding medium, observing coincidences between the detection of one beta particle before and after penetrating said retarding medium and also observing the total number of beta radiations detected.

6. A method of geophysical prospecting that comprises discriminating between gamma radiations of varying frequency that comprises utilizing said radiations to form beta radiations, detecting said beta radiations, causing said detected beta radiations to attempt to penetrate a retarding medium and detecting the beta radiations that are able to penetrate said retarding medium, observing coincidences between the detection of one beta particle before and after penetrating said retarding medium and also observing the number of beta radiations that do not pass through the retarding medium.

7. A method of geophysical prospecting that comprises discriminating between penetrating radiations of varying energy that comprises utilizing said radiations to form less penetrating radiations, causing said less penetrating radiations to attempt to pass through a retarding medium and measuring the number of less penetrating radiations that are able to pass through said retarding medium.

8. A method of geophysical prospecting that comprises discriminating between penetrating radiations of varying energy that comprises utilizing said radiations to form less penetrating radiations, causing said less penetrating radiations to attempt to pass through a retarding medium, measuring the number of less penetrating radiations that are formed and also the number of less penetrating radiations that are able to penetrate said retarding medium.

9. A method of geophysical prospecting that comprises discriminating between penetrating radiations of varying energy that comprises utilizing said radiations to form less penetrating radiations, causing said less penetrating radiations to attempt to pass through a retarding medium, measuring the number of less penetrating radiations able to penetrate said retarding medium and measuring the number of less penetrating radiations not able to penetrate said retarding medium.

10. A device for geophysical prospecting by discriminating between radiations of varying energy that comprises at least one pair of counters separated by a radiation retarding medium, means for detecting coincidental actuation of the counters and means for detecting non-coincidental actuation of the counters.

11. A device for geophysical prospecting by discriminating between radiations of varying energy that comprises a pair of counters separated by a radiation retarding partition and surrounded by means for converting said penetrating radiation into less penetrating radiations and means for detecting coincidental actuation of said counters.

12. A device for geophysical prospecting by discriminating between radiations of varying energy and adapted to be lowered into openings in the earth comprising a sealed casing, at least one pair of counters in said casing, a radiation retarding partition between said counters and means for detecting coincidental actuation of said counters.

13. A device for geophysical prospecting by discriminating between gamma radiations of varying frequency and adapted to be lowered into openings in the earth that comprises a sealed casing, a pair of counters arranged in side by side relationship in said chamber, a shield adapted to convert gamma rays into beta rays, a shield between said counters through which only beta rays of relatively high energy will penetrate and means for detecting coincidental actuation of said counters.

14. A device for geophysical prospecting by discriminating between gamma radiations of varying frequency and adapted to be lowered into openings in the earth that comprises a sealed casing, at least one pair of counters arranged in side by side relationship in said chamber, a shield adapted to convert gamma rays into beta rays, a shield between said counters through which only beta rays of relatively high energy will penetrate, means for detecting coincidental actuation of said counters and means for detecting non-coincidental actuation of said counters.

15. A device for geophysical prospecting as described in claim 13 including in addition means for recording the coincidences detected in correlation with indications of depth at which the counters are located at the time of the detection.

16. A device for geophysical prospecting as described in claim 14 in which is additionally included means for recording both the coincidences and non-coincidences detected in correlation with indications of the position of the detecting apparatus at the time of the detection.

17. A method of geophysical prospecting that comprises radiating geophysical formations about which information is desired, discriminating between radiations of varying energy that return from the formations by utilizing said radiations to form beta radiations, detecting said beta radiations, causing said detected beta radiations to impinge upon a partition, detecting the beta radiations that are able to pass through said partition and comparing the results of the detection.

18. A method of geophysical prospecting that comprises radiating geophysical formations about which information is desired with neutrons, discriminating between radiations of varying energy that return from the formations by utilizing said radiations to form beta radiations, detecting said beta radiations, causing said detected beta radiations to impinge upon a partition, detecting the beta radiations that are able to pass through said partition and comparing the results of the detection.

BRUNO PONTECORVO.